United States Patent [19]

McCalla et al.

[11] 3,915,187

[45] Oct. 28, 1975

[54] CHEMICAL FEEDER

[75] Inventors: David McCalla, Stuart, Fla.; Louis H. Ritter, Creve Coeur, Mo.

[73] Assignee: Aqua Treat, Inc., Stuart, Fla.

[22] Filed: Mar. 1, 1974

[21] Appl. No.: 447,413

[52] U.S. Cl. ........... 137/101.27; 137/391; 137/409; 222/129.2
[51] Int. Cl.² .................. F16K 21/18; F16K 31/18; G05D 11/02
[58] Field of Search.......... 137/100, 101.11, 101.25, 137/101.27, 391, 409, 563; 222/67, 69, 129.2

[56] References Cited
UNITED STATES PATENTS

| | | | |
|---|---|---|---|
| 1,851,927 | 3/1932 | McCord | 137/391 |
| 2,912,995 | 11/1959 | Ulanovsky | 137/101.27 |
| 3,163,174 | 12/1964 | Pintz | 137/101.27 |
| 3,434,490 | 3/1969 | Lyall | 137/101.11 |
| 3,721,258 | 3/1973 | Dermiah et al. | 137/101.27 |

Primary Examiner—Martin P. Schwadron
Assistant Examiner—George L. Walton
Attorney, Agent, or Firm—Arthur L. Morsell, Jr.

[57] ABSTRACT

A make-up water valve directs make-up water into a delivery conduit whenever the water level in a cooling water sump falls below a predetermined level. The delivery conduit has a venturi for generating suction in response to make-up water flow. A feed tube which is supplied with liquid chemicals is coupled to the suction region of the venturi for feeding chemicals into the make-up water, and a water bleed-off valve is simultaneously operated by the suction. The feed tube includes a valve seat and a float valve thereabove. An adjustable stop limits the height to which the float valve may rise, thereby defining a metering gap between the bottom of the float valve and the valve seat for metering the amount of chemical fluid which is drawn into the venturi during each charge of make-up water.

13 Claims, 3 Drawing Figures

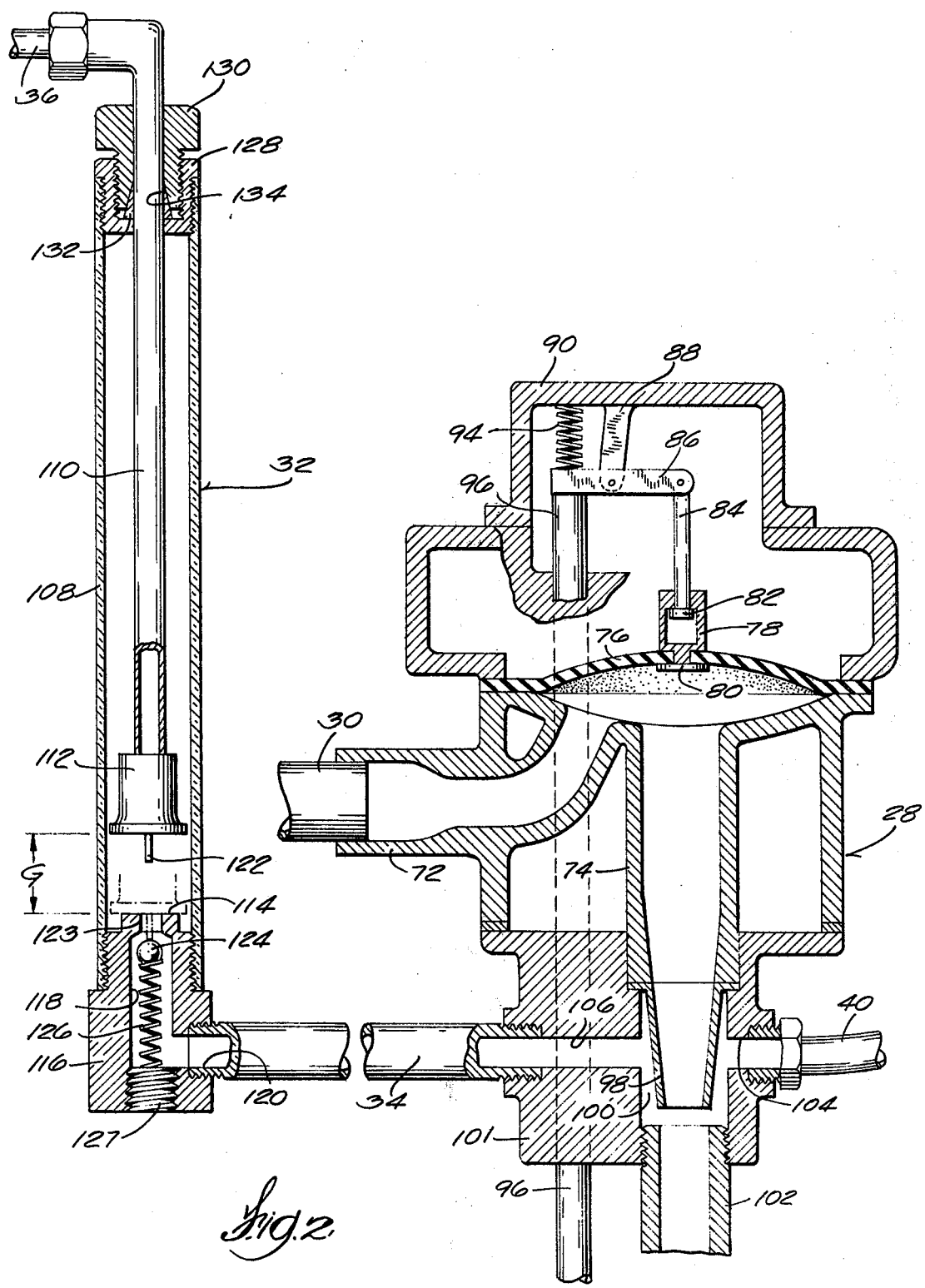

CHEMICAL FEEDER

BACKGROUND OF THE INVENTION

This invention relates to feed mechanisms for feeding chemicals into make-up water in water cooling towers, evaporative condensers, or the like. In large cooling towers (200–5,000 tons), chemicals are frequently fed into the make-up water by electronic metering mechanisms. However, these are complicated and are too expensive to be used on small cooling towers (below 200 tons). In cooling towers there is a sump for receiving the cooling water from which the latter is delivered to the condenser and then recirculated. These cooling towers may be installed on a roof or on ground level or inside a building, and there is a normal loss of water through evaporation. Inasmuch as solids and minerals stay in the liquid and do not pass off by evaporation, there is an eventual build-up which, in many types of installations, requires periodic mechanical or chemical cleaning. The addition of make-up water to make up for evaporation and bleed-off is also necessary, as is the treatment of the cooling water with chemicals for the purpose of controlling, primarily, scale and corrosion. The proper metering of the chemicals into the system and proper bleed-off control has always been a problem.

Heretofore, with small tonnage units, chemical pellets have been fed in automatically, but there has been no way of controlling a proportional bleed-off. This then had to be done by hand, either periodically or bled through an opened valve continuously with consequent waste of chemicals, water and power. If you do not bleed off water regularly in an installation where evaporation occurs, the resulting concentration of solids and minerals will result in build up of deposits in or on the condenser (heat exchanger) tubes, piping, etc., causing very inefficient operation and eventually necessitating costly shut-down to clean the system.

Accordingly, one object of this invention is to provide a non-electric, automatic chemical feeder which is relatively simple and inexpensive and adapted for use in small cooling towers.

Another object of this invention is to provide a chemical feeder which is accurate and reliable in operation.

A further object of the invention is to provide a chemical feeder which is particularly suitable for use with liquid chemicals which are difficult to accurately meter and which are sometimes of a viscous nature so as to be likely to cause sticking of valve parts.

A further object of the invention is to provide a chemical feeder which is particularly suitable for use in conjunction with a cooling water system in an installation where there is automatic addition of make-up water and where automatic proportional bleed-off of circulating water is necessary or desired.

Other objects and advantages of the invention will be apparent to those skilled in the art from the description hereof.

SUMMARY OF THE INVENTION

A make-up water valve directs make-up water into a delivery conduit whenever the water level in a container or sump falls below a predetermined level. The delivery conduit has a venturi for generating suction in response to make-up water flow. A feed tube which is supplied with liquid chemicals is coupled to the delivery conduit in the region of the venturi for feeding chemicals into the make-up water, and the suction may also operate a water bleed-off valve where needed. The feed tube includes a valve seat and a valve member cooperable therewith, and an adjustable stop for limiting movement of the valve member to adjust the size of a gap and thereby meter the amount of chemical fluid which is drawn into the make-up water during each charge of said make-up water.

DESCRIPTION OF THE DRAWINGS

FIG. 2 is a view principally in vertical section, showing the make-up water valve with associated delivery conduit and venturi, and showing the chemical feeder.

DESCRIPTION OF THE PREFERRED EMBODIMENT

Figure 1:
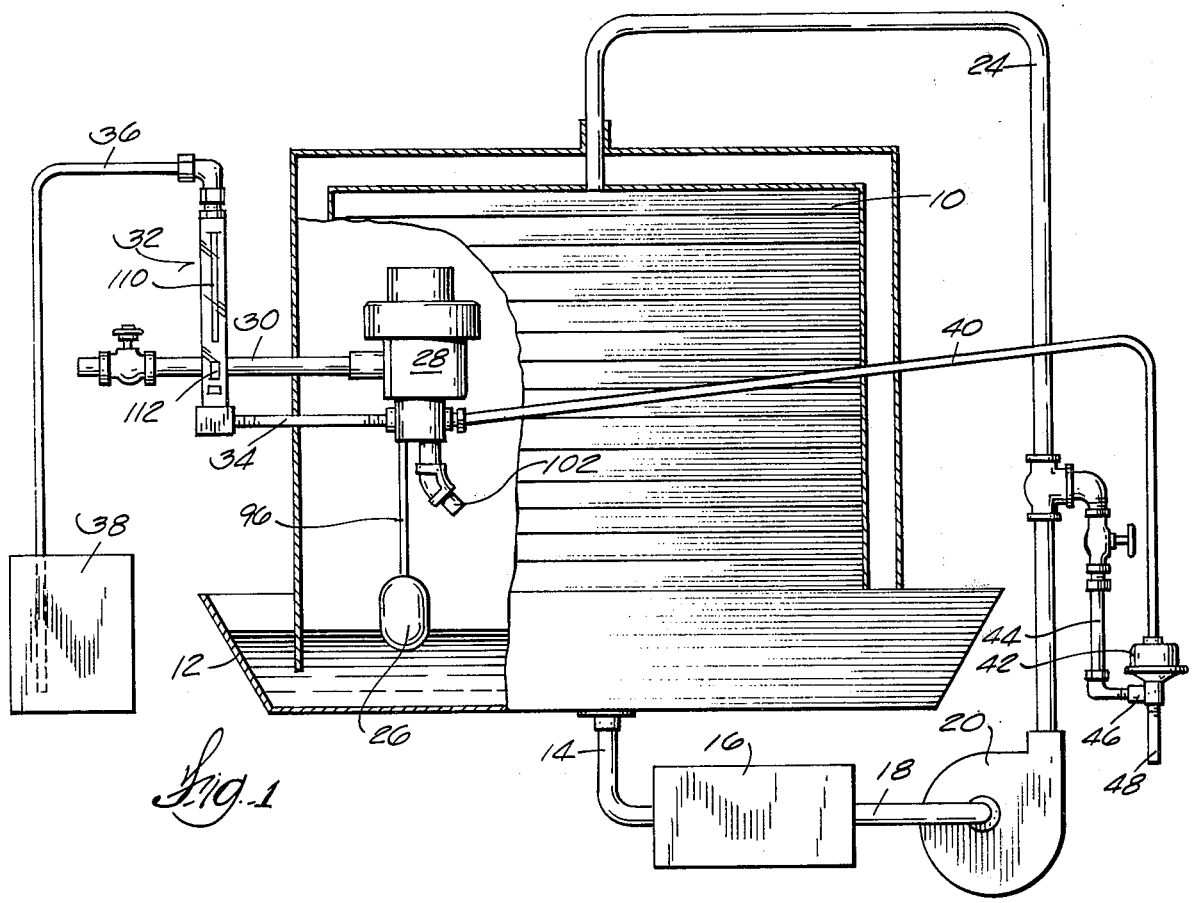
FIG. 1 is an elevation view, partially cut away, of a water cooling system utilizing a chemical feeder of this invention.

Referring to FIG. 1 which illustrates one preferred use for the invention, a conventional cooling tower 10 has a bottom sump or container 12 for receiving water which runs or drips down through cooling tower 10. From sump 12, the cooled water is conducted via a conduit 14 to an air conditioner or refrigeration condenser or heat exchanger 16. From air conditioner condenser 16, the water goes through a conduit 18 to a recirculating pump 20 which pumps it through conduits 22 and 24 back to the top of the cooling tower 10.

A float 26 supported above the sump 12 opens a make-up water valve in housing 28 when the water in the sump 12 falls below a predetermined level and closes the make-up water valve when the water rises above a predetermined level. A supply conduit 30 brings fresh water into make-up water valve housing 28.

A chemical feeder 32 is coupled via conduit 34 with the make-up water valve housing 28 to draw liquid chemicals into the make-up water for controlling scale and corrosion. Chemical feeder 32 is coupled via conduit 36 with a chemical container 38.

Make-up water is directed through a delivery conduit 102 which includes a venturi 98 for generating suction in response to the flow of make-up water. The suction is coupled to conduit 34 to draw a charge of chemicals into the make-up water and is also coupled via a conduit 40 to a pneumatic bleed-off valve 42 which, when activated, bleeds some of the water out of the cooling system via conduits 44 and 48. The purpose of bleeding an adjustable, proportional amount of the water from the cooling system when make-up water is added is to prevent a build-up of solids and minerals which would otherwise become a problem.

THE WATER BLEED-OFF VALVE

Figure 3:
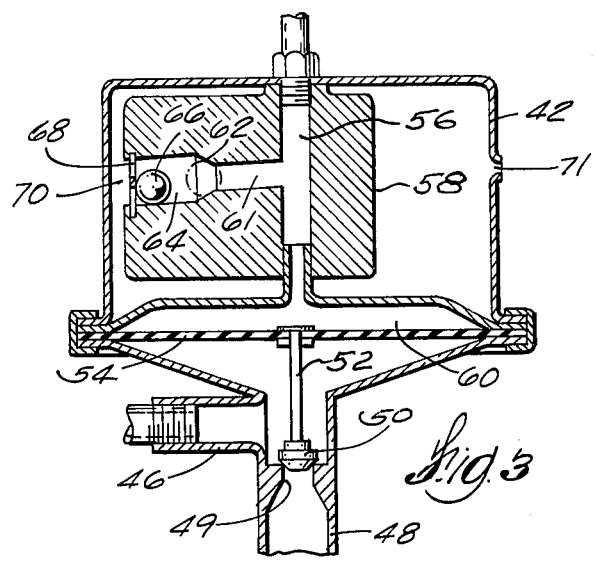
FIG. 3 is a vertical sectional view of the water bleed-off valve.

FIG. 3 is a longitudinal sectional view of the preferred water bleed-off valve 42. It includes a water inlet 46, a water outlet 48, a valve seat 49, a valve member 50, a valve stem 52, and a flexible diaphragm 54 to which the upper end of the valve stem is connected. Suction is introduced into the valve through a bore 56 in a block of plexiglas or like material 58. Bore 56 communicates into a chamber 60 above diaphragm 54. Suction in chamber 60 draws the diaphragm 54 up. This raises valve member 50 off valve seat 49 and allows water to bleed off through the outlet 48. When the suction in chamber 60 is terminated, valve member 50 moves against valve seat 49 and stops flow of water. A vacuum relief valve is formed in the block of plexiglas 58 to admit atmospheric air into bore 56 when the suction therein terminates. This allows any water which is caught in the end of conduit 40 (FIG. 1) to be released for movement out of the conduit by gravity. The vacuum relief valve is formed by a bore 61, a valve seat 62, and a sloping bore 64 in which a ball 66 is rollably contained. The end of bore 64 is closed by a cover 68 which has an air vent hole 70 therein whereby there is communication through the casing air hole 71 with the atmosphere. When suction is applied to bore 56, ball 66 is drawn against valve seat 62 and seals the bore 61. Therefore, the vacuum relief valve has no affect on the suction in bore 56. But when the suction in bore 56 terminates, ball 66 rolls away from valve seat 62 under the influence of gravity and admits atmospheric air into bore 56 to break the vacuum. This allows any water which is caught in the other end of conduit 40 to be released for movement out of conduit 40 under the influence of gravity.

THE MAKE-UP WATER VALVE

FIG. 2 is a longitudinal sectional view of the make-up water valve, delivery conduit, venturi, and chemical feeder mechanism. The make-up water valve includes a water inlet 72, a delivery conduit 74, and a flexible valve diaphragm 76 which is movable between the dotted line position, which closes the valve, and the full line open position. The diaphragm 76 is moved between its two positions by any suitable mechanism which is responsive to movements of the rod 96, which movements are controlled by the float 26. Illustrative of one type of mechanism, there is a lost-motion linkage which enables diaphragm 76 to snap from the fully-closed to the fully-opened position and vice versa so as to provide the full value of suction from the venturi for the full time period in which the make-up water valve 28 is open. The lost-motion linkage may include a hollow cylinder 78 which is attached to the center of diaphragm 76 by a rivet 80. A disk 82 attached to a rod 84 is movable longitudinally within cylinder 78. When disk 82 abuts against the top or bottom of cylinder 78, it moves diaphragm 76 upwardly or downwardly, but in the inbetween positions, there is lost motion to prevent partial closing or opening of the valve.

The rod 84 is attached to one end of a rocker arm 86 which is pivotally attached at a suitable point in its length to a support 88 which projects downwardly from the top of a cap 90. Cap 90 is attached by suitable means such as bolts (not shown) to a valve housing part 92 which encloses diaphragm 76. A compression spring 94 urges the left-hand end of rocker arm 86 downwardly and thereby urges the right-hand end of rocker arm 86 upwardly. A plunger 96 which is attached to float 26 (FIG. 1) is engageable with the left-hand end of rocker arm 86 on the side opposite the spring 94. As float 26 rises, it tilts rocker arm 86 and causes rod 84 to move downwardly. After the lost motion is taken up, disk 82 strikes the bottom of cylinder 78 and causes the diaphragm 76 to snap to the closed position shown in dotted lines in FIG. 2. This closes valve 28. When float 26 drops, spring 94 causes rocker arm 86 to tilt in the opposite direction, raising rod 84. After the lost motion is taken up, piston 82 strikes the top of cylinder 78 and causes the diaphragm 76 to move to the open position shown in solid lines in FIG. 2. This opens the valve.

Thus, when the water level in sump 12 (FIG. 1) drops below a predetermined level, make-up water valve 28 is automatically opened to admit make-up water into sump 12, and when the water level in container 12 rises above a predetermined level, make-up water valve 76 is automatically closed to terminate the flow of make-up water.

At the lower end of make-up water delivery conduit 74, a venturi nozzle 98 is attached, being surrounded by a vacuum chamber 100. Water leaving venturi nozzle 98 enters a discharge conduit 102. The water leaves nozzle 98 at a relatively high velocity and entrains air from vacuum chamber 100, thereby producing suction. The housing portion 101, which houses the vacuum chamber 100, includes two bores 104 and 106, one of which is coupled to conduit 40 and the other of which is coupled to conduit 34. Conduit 40 couples the suction to the water bleed-off valve 42, described hereinabove. Conduit 34 couples the suction to the chemical feeder mechanism described below.

THE CHEMICAL FEED

The chemical feeder mechanism includes a feed tube 108 (FIG. 2) which is coupled at its upper end to conduit 36 to receive chemical liquid from a chemical container 38 (FIG. 1). The chemical liquid, which in the embodiment shown in FIG. 1 may be, but is not necessarily, quite viscous, enters feed tube 108 through a chemical inlet tube 110 (FIG. 2) which also serves as an adjustable stop member as described hereinafter. Below the lower end of tube 110, a float valve 112 is movable between the lower end of tube 110 and a valve seat 114 which is formed in an end of a fitting 116, the latter being threaded into the lower end of feed tube 108. Float valve 112 is significantly less dense than the chemical liquid in feed tube 108. Bores 118 and 120 are formed in end fitting 116 for conducting the chemical liquid from the bottom of feed tube 108 to conduit 34. The bottom of float valve 112 is shaped to seal off valve seat 114 when float valve 112 is at the lower extremity of its movement. A pin 122 projects from the bottom of float valve 112, and extends through a duct 123 below valve seat 114 when float valve 112 is in contact with valve seat 114. Pin 122 is in engagement at its lower end with a ball 124 which is urged upwardly by a spring 126, the latter being strong enough to move float member 112 upwardly when the suction is ineffective, but which is not strong enough to move float member 112 upwardly when the suction is effective in the duct 118. Spring 126 is removably held in place by a threaded plug 127. Pin 122, ball 124, and spring 126 serve to break any seal between float valve 112 and valve seat 114 when the flow of make-up water terminates in delivery conduit 74. Such seal is likely to occur because of the viscous nature of the chemical liquid sometimes used in the embodiment of the invention which is illustrated. This frees float valve 112 to float up through the chemical liquid in feed tube 108 until it contacts the lower end of tube 110, which is adjustably supported at its upper end by two interconnected threaded members 128 and 130, there being a conical wedge 132 cooperable with a matching conical surface 134 on member 130. As member 130 is screwed downwardly into the threaded recess in member 128, conical wedge 134 presses against conical surface 134 to cause clamping against the tube 110 to lock it in a predetermined position of adjustment. If member 130 is backed off a few turns, it frees tube 110 to be manually moved upwardly or downwardly to vary the position of its lower end, which end limits the upward movement of float valve 112. After tube 110 has been set to the desired position, member 130 is tightened to clamp tube 110 in the desired position. The position of the end of tube 110 determines the amount of chemical liquid which is contained in the chemical metering gap G between the bottom of float valve 112 and the top of valve seat 114. This in turn determines the amount of chemical liquid that will be drawn into the make-up water.

In between charges of make-up water, float valve 112 floats in its uppermost position as shown in the solid lines in FIG. 2. When make-up water begins to flow through delivery conduit 74 and venturi nozzle 98, suction is developed in vacuum chamber 100. This draws chemical into chamber 100 and down into the stream of water entering conduit 102. The chemical liquid flows from metering gap G through bores 118 and 120, conduit 34, and bore 106 into chamber 100. The suction opens ball valve 124 and draws float valve 112 downwardly. When an amount of chemical liquid equal to the amount contained in the metering gap G has been drawn into the make-up water stream, the bottom of float valve 112 seats against valve seat 114 and blocks off any further flow of chemical. The suction applied from chamber 100 holds the float valve seated against the force of spring 126 as long as the make-up water continues to flow through delivery conduit 74. However, when the flow of make-up water ceases, spring 126 pushes ball 124 against pin 122, thus dislodging float valve 112 from valve seat 114. This serves to break any adhesion between the float and the valve seat. Such adhesion is very likely to occur because of the viscous nature of the chemicals. The float then rises through the chemical fluid in feed tube 108 due to its inherent buoyancy. It slowly floats back up to the upward position shown in solid lines in FIG. 2. This allows another charge of chemical fluid to fill the metering gap G ready to be drawn into the make-up water the next time it flows. As described above, tube 110 may be raised or lowered as desired to change the length of metering gap G, thereby changing the amount of chemical drawn into the make-up water.

We claim:

1. In a water circulation system including a water container, a source of make-up water, a make-up water valve, means for opening the make-up water valve when the water in the container falls below a predetermined level and for closing the make-up water valve when the water in the container rises above a predetermined level, a delivery conduit positioned to direct make-up water into said container and including a venturi in said delivery conduit for creating a suction in response to flow of make-up water, the improvement comprising a feeder for feeding a predetermined amount of liquid chemical into said delivery conduit, which feeder comprises an upright feed tube, a source of liquid chemical communicating with said feed tube, a suction conduit connecting said feed tube with said make-up water delivery conduit adjacent said venturi for applying suction to said feed tube when make-up water is flowing through said delivery conduit to cause the flow of chemical therefrom, valve means in said tube for controlling said flow of chemical from the feed tube into the delivery conduit and including a valve seat and a float forming a valve member which is normally urged by its buoyancy to a position away from the valve seat to provide a chemical metering gap therebetween after the flow of chemical has been stopped, adjustable means in the feed tube for limiting the amount of buoyant movement of the valve member away from the valve seat to adjust the size of said chemical metering gap, there being a duct in said feed tube having upper and lower ends with said valve seat at its upper end, and there being an auxiliary seat at the lower end of said duct, a pin projecting from that end of the valve member which is adjacent the upper end of said duct and positioned to extend through said duct when the valve member is seated, spring means positioned adjacent the lower end of said duct, a check valve between said spring means and said lower end whereby said spring means urges said check valve against said pin to break any seal between said valve member and said seat at the upper end of the duct after suction terminates, said spring being weak enough so that the check valve yields in response to suction but being strong enough to cause said check valve to forcibly strike said pin when said suction ceases.

2. In a water circulation system including a water container, a source of make-up water, a make-up water valve, means for opening the make-up water valve when the water in the container falls below a predetermined level and for closing the make-up water valve when the water in the container rises above a predetermined level, a delivery conduit positioned to direct make-up water into said container and including a venturi in said delivery conduit for creating a suction in response to flow of make-up water, the improvement comprising a feeder for feeding a predetermined amount of liquid chemical into said delivery conduit, which feeder comprises a feed tube, a source of liquid chemical communicating with said feed tube, a suction conduit connecting said feed tube with said make-up water delivery conduit adjacent said venturi for applying suction to said feed tube when make-up water is flowing through said delivery conduit to cause the flow of chemical therefrom, valve means in said tube for controlling said flow of chemical from the feed tube into the delivery conduit and including a valve seat and a valve member positioned within said feed tube for coaction with said valve seat, adjustable means in the feed tube for metering the amount of liquid chemical which is introduced during each period of make-up water flow, a second suction conduit communicating with said make-up water delivery conduit adjacent said venturi, and a suction-operated water bleed-off coupled to said second suction conduit for bleeding water out of said system every time make-up water flows in.

3. The apparatus of claim 2 and further comprising a vacuum relief valve in said water bleed-off valve for admitting atmospheric air to said second suction conduit when the suction therein terminates to permit water to drain therefrom.

4. In a water circulation system including a water container, a source of make-up water, a make-up water valve, means for opening the make-up water valve when the water in the container falls below a predetermined level and for closing the make-up water valve when the water in the container rises above a predetermined level, a delivery conduit positioned to direct make-up water into said container and including a venturi in said delivery conduit for creating a suction in response to flow of make-up water, the improvement comprising a feeder for feeding a predetermined amount of liquid chemical into said delivery conduit, which feeder comprises an upright feed tube, a source of liquid chemical communicating with said feed tube and having an inlet therein, a valve having a valve seat in a lower portion of said feed tube, a suction conduit connecting with said feed tube at a location below said chemical inlet and connecting with said make-up water delivery conduit adjacent said venturi for applying suction to said feed tube when make-up water is flowing through said delivery conduit to cause flow of a metered batch of chemical from the feed tube, a float valve member loosely fitted in said feed tube above said valve seat, means for limiting the upward buoyant movement of said float valve in said feed tube to define a metering gap between the float valve and valve seat, which gap meters the batch of chemical to be fed, suction-operated check valve means in said feed tube adjacent said valve seat preventing flow of chemical through the suction conduit when there is no suction and while a new batch is being accumulated between the valve seat and float valve, said float valve being positioned for movement into engagement with said valve seat after the batch of chemical has been drawn from the feed tube to prevent further delivery of chemical during the same occurrence of make-up water flow.

5. The apparatus of claim 4 in which the water circulation system includes a cooling tower, and in which the water container is the sump of said cooling tower.

6. The apparatus of claim 4 in which the float valve member has an outwardly-flared portion of such size that there is a limited clearance space between the periphery of said flared portion and the interior of the feed tube, and in which the inlet for the liquid chemical is located above said float valve to move downwardly by gravity through said clearance space into the metering gap.

7. The apparatus of claim 4 in which there is a valve duct at the lower end of said feed tube with said valve duct having upper and lower ends and with said valve seat at its upper end, and in which said suction-operated check valve means coacts with a seat at the lower end of said valve duct.

8. The apparatus of claim 4 in which the means for limiting upward buoyant movement of the float valve is a chemical inlet tube projecting downwardly into the feed tube and having its lower discharge end positioned to form a stop limiting upward movement of the float valve.

9. The apparatus of claim 8 in which the chemical inlet tube is adjustably supported to vary the position of the lower discharge end thereof.

10. The apparatus of claim 7 in which said valve duct at the lower end of the feed tube is in the upper end of a fitting with the latter having a bore communicating with the lower end of said valve duct, said suction conduit communicating with said bore, and in which the check valve means includes a ball in said bore for coaction with the seat at the lower end of said valve duct, and in which there is spring means in said bore normally urging said ball into seating position.

11. The apparatus of claim 10 in which there is a pin carried by the lower end of said float valve member which projects through said valve duct when the float valve member is closed, said spring being of sufficient strength to cause the ball to forcibly strike the pin when suction ceases to urge the ball off of its valve seat.

12. In a water circulation system including a water container, a source of make-up water, a make-up water valve, means for opening the make-up water valve when the water in the container falls below a predetermined level and for closing the make-up water valve when the water in the container rises above a predetermined level, a delivery conduit positioned to direct make-up water into said container and including a venturi in said delivery conduit for creating a suction in response to flow of make-up water, the improvement comprising a feeder for feeding a predetermined amount of liquid chemical into said delivery conduit, which feeder comprises an upright feed tube, a source of liquid chemical communicating with said feed tube and having an inlet therein, a valve having upper and lower valve seats in a lower portion of said feed tube, a suction conduit connecting with said feed tube below said valve and at a location below said chemical inlet and connecting with said make-up water delivery conduit adjacent said venturi for applying suction to said feed tube when make-up water is flowing through said delivery conduit to cause flow of a metered batch of chemical from the feed tube, a float valve member loosely mounted in said feed tube above said upper valve seat, adjustable means for limiting the upward buoyant movement of said float valve in said feed tube to define a metering gap between the float valve member and said upper valve seat which gap meters the batch of chemical to be fed, said float valve member being positioned for movement into engagement with said upper valve seat after the batch of chemical has been drawn from the feed tube to prevent further delivery of chemical during the same occurrence of make-up water flow, and a suction-operated auxiliary valve member cooperable with said lower valve seat to maintain said valve closed while the float valve is rising during the metering of a new batch of chemical.

13. The apparatus of claim 12 in which the water circulation system includes a cooling tower, and in which the water container is the sump of said cooling tower.

* * * * *